Patented Nov. 25, 1941

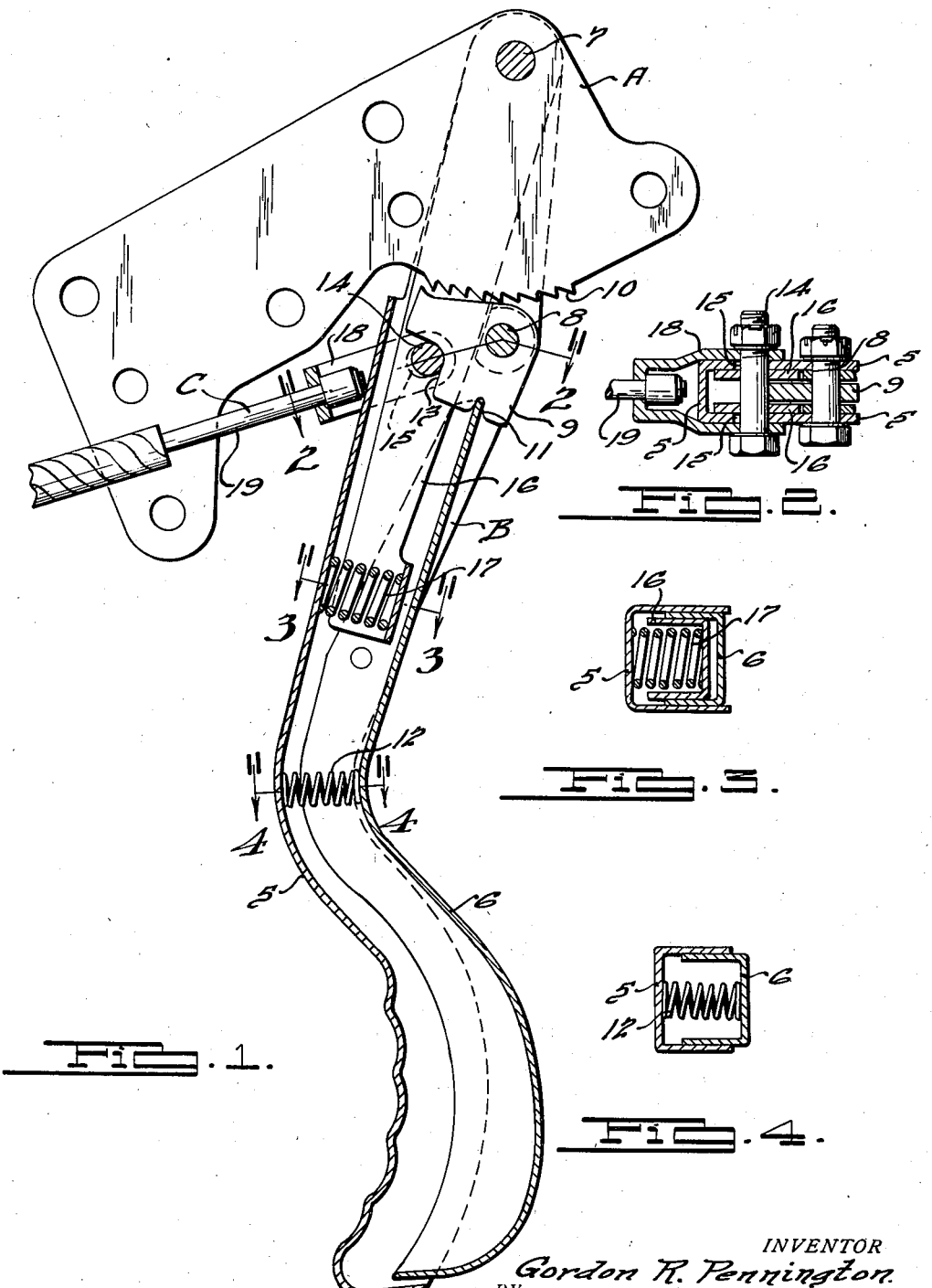

2,264,005

UNITED STATES PATENT OFFICE 2,264,005

BRAKE MECHANISM

Gordon R. Pennington, Bloomfield Hills, Mich., assignor to Chrysler Corporation, Highland Park, Mich., a corporation of Delaware Application December 22, 1939, Serial No. 310,478

3 Claims. (Cl. 74—537)

This invention relates to improvements in brake mechanism and more particularly to actuating means therefor.

The invention is illustrated and described in connection with manually operable emergency brake actuating apparatus for which it is particularly useful, although it will be understood that the invention in its broader aspects is not to be limited by the illustrative embodiment.

It has been found that considerable difficulties result from operation of the emergency brake, among which difficulties is the frequency with which the actuating means such as the lever is latched into position so that the brake is only partially applied and does not exert a noticeable drag when the vehicle is moved by engine power.

One of the main objects of the invention is to overcome the aforesaid difficulties by the provision in a brake mechanism of an actuating means which can be latched or otherwise secured in a brake applying position only when it is so positioned as to cause the brake to exert a predetermined braking action.

Another object of the invention is the provision in a brake actuating means of a preloaded spring which prevents mechanical retention of the brake actuating means in a brake applying position until a predetermined braking force is exerted, and which yieldably accommodates such retention when the predetermined braking force has been exerted.

A still further object of the invention is the provision in a brake mechanism having actuating apparatus adapted to be latched or otherwise retained in brake applying position, of a spring actuated stop normally preventing latching of the actuating apparatus in brake applying position and which yieldably accommodates such retention in response to a predetermined braking force applied by the actuating apparatus on the brake.

The braking apparatus embodying the foregoing features compels the operator to apply the brake under all conditions so that the resulting drag is noticeable to an extent as to warn the vehicle operator of the condition of the apparatus. Inasmuch as the preloaded spring is overcome in response to a given or predetermined brake applying force exerted thereon, it will be apparent that limiting wear of the brake parts, such as the band, will not affect operation of the apparatus in its function of exerting the desired noticeable brake drag warning when the actuating means is latched in brake applying position.

Other objects and advantages of the invention will be more apparent from the following description taken in connection with the accompanying drawing, in which:

Fig. 1 is a side elevational view, partly in section, of a brake actuating apparatus embodying the invention.

Figs. 2, 3 and 4 are cross sectional views taken on the lines 2—2, 3—3, and 4—4, respectively, of Fig. 1.

Referring to the drawing, the invention is illustrated and described as applied to an emergency brake lever of the dash type for use with automotive vehicles. The apparatus includes a support A adapted to be suitably fixed to the vehicle, a lever B pivotally attached to the support A, and a connection C between the lever B and the brake mechanism (not shown) whereby pivotal movement of the lever B in an anti-clockwise direction, as viewed in Fig. 1 transmits a brake applying force to the brake mechanism.

The lever B includes relatively movable parts 5 and 6 cooperating to provide a grip portion, the part 5 being in the form of a channel, pivotally attached by pin 7 to the support A, and receiving therein the correspondingly shaped, relatively short part 6. Pivotally attached by a pin 8 to the lever part 5 is a pawl 9 adapted to selectively engage the ratchet teeth 10 of the support A whereby the lever can be latched in brake applying position. The face of the pawl adjacent the grip portion of the lever is provided with a recess 11 in which is received the adjacent end of the lever part 6. A coil spring 12 yieldably urges the parts 5 and 6 apart and in so doing tends to rotate the pawl in a clockwise direction as viewed in Fig. 1 to engage the teeth 10. When the lever part 6 is moved toward the part 5 against the action of the spring 12, the pawl is rotated to a non-engaging position with respect to the teeth 10.

In order to prevent latching of the lever B in a brake applying position until a predetermined braking force has been applied, the pawl 9 is provided with a concave face 13 receiving a connecting pin 14 extending through registering openings in the side walls of the channel-shaped lever part 5 and corresponding openings in the spaced side walls of a lever part 16 which is pivotally connected to the support A by the pin 7.

A preloaded spring 17 acting between the lever parts 5 and 16 urges the pin 14 into the pawl face 13. The pin 14 extends through registering openings in a yoke member 18 connected with the cable 19 of the part C, whereby the latter and the lever B are operatively connected.

The members 5 and 16 constitute relatively movable parts which are yieldably urged apart by the preloaded spring 17, and the elongated openings 15 and the pin 14 constitute a lost motion connection therebetween, these relatively movable parts moving together in response to movement of the lever B to exert a predetermined brake applying force on the cable 19, until the force exerted by the lever on the cable overcomes the opposition of the spring 17, whereupon the lost motion connection accommodates relative movement between these lever parts.

As illustrated, the pin 14 is positioned in the face 13 by the spring 17 and acts as a stop to prevent engagement of the pawl 9 with the ratchet teeth 10. When the lever B is moved to exert a brake applying force on the cable 19, the pin 14 will remain in the illustrated position until the brake applying force is of a magnitude sufficient to overcome opposition of the preloaded spring 17 to movement of the pin laterally in the elongated openings 15 to release the pawl for engagement with the teeth under influence of the spring 12. When, however, the opposition of the spring 17 is overcome by such movement of the lever, and relative movement between the members 5 and 6 occurs, the pin will move laterally in the elongated openings and free from engagement with the pawl to permit engagement of the pawl with the latch teeth to thereby latch the lever in brake applying position. The spring is so loaded as to exert a predetermined opposition to release the stop pin 14 from its illustrated blocking position, thus insuring that the brakes will be applied in a manner to exert a predetermined braking action, prior to latching of the lever in a brake applying position. The relative arrangement of the parts, including preloading of the spring 17, may be varied to vary the braking action exerted in order to latch the lever in brake applying position, but the arrangement is preferably such that the braking action will be sufficient to exert a drag which, upon starting of the vehicle or its propelling power, will be sufficient to warn the operator of the condition of the brake or brakes.

Although but one embodiment of the invention is herein shown and described, it will be understood that various changes in the size, shape and arrangement of parts may be made without departing from the spirit of my invention and it is not my intention to limit said invention other than by the terms of the appended claims.

I claim:

1. In an actuating mechanism for a brake, a support, a lever including a member pivotally secured to said support, a latch pivotally secured to said lever member and releasably engageable with said support for retaining said lever in brake applying position, force transmitting means for connecting said lever and brake, a pin connecting said force transmitting means and said lever and engageable with said latch to position the latter out of engagement with said support, a spring acting against said lever member for urging said pin to said position, said pin having a lost motion connection with said lever member accommodating movement thereof relative to the latter and free from engagement with said latch against the opposition of said spring to accommodate engagement of said latch with said support in response to the application of predetermined brake applying force exerted by said lever on said force transmitting connection.

2. In an actuating mechanism for a brake, a support, lever means including a member pivotally secured to said support and a member movable relative to the first mentioned member, a latch having a recessed portion pivotally secured to said lever means and releasably engageable with said support for retaining said lever means in brake applying position, said latch being pivotally movable by the second mentioned lever member to release said lever means from its brake applying position, force transmitting means for connecting the brake and lever means, a pin connecting said force transmitting means and the first mentioned lever member and engaging the recessed portion of said latch for retaining the latter against latching engagement with said support, a spring yieldably urging said pin in engagement with said latch, said pin having a lost motion connection with said first mentioned lever member accommodating movement thereof relative to the latter and to said latch against the opposition of said spring to permit engagement of said latch with said support in response to predetermined brake applying force exerted by said lever means on said force transmitting connection.

3. In an actuating mechanism for a brake, a fixed member, a pivotally mounted lever, a latch pivotally secured to said lever and releasably engageable with said member for latching said lever in brake applying position, force transmitting means including a yoke for connecting the lever and brake, a pin connecting said yoke and lever and engaging said latch for retaining the latter against latching engagement with said support, a spring urging said pin into engagement with said latch, and means accommodating movement of said pin against the opposition of said spring free from engagement with said latch in response to brake applying movement of said lever.

GORDON R. PENNINGTON.